United States Patent
Bartley et al.

(10) Patent No.: US 10,157,527 B1
(45) Date of Patent: Dec. 18, 2018

(54) EMBOSSED PRINTED CIRCUIT BOARD FOR INTRUSION DETECTION

(71) Applicant: International Business Machines Corporation, Armonk, NY (US)

(72) Inventors: Gerald Bartley, Rochester, MN (US); Darryl Becker, Rochester, MN (US); Matthew S. Doyle, Chatfield, MN (US); Mark Jeanson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/824,592

(22) Filed: Nov. 28, 2017

(51) Int. Cl.
| | |
|---|---|
| *G08B 13/24* | (2006.01) |
| *G06F 11/30* | (2006.01) |
| *G06F 21/82* | (2013.01) |
| *H05K 7/02* | (2006.01) |
| *G08B 29/04* | (2006.01) |
| *G06F 11/34* | (2006.01) |

(52) U.S. Cl.
CPC ...... *G08B 13/2494* (2013.01); *G06F 11/3096* (2013.01); *G06F 11/3438* (2013.01); *G06F 21/82* (2013.01); *G08B 29/046* (2013.01); *H05K 7/02* (2013.01); *H01H 2239/032* (2013.01)

(58) Field of Classification Search
CPC .............. G08B 13/2494; G08B 29/046; G06F 11/3096; G06F 21/82; G06F 11/3438; H01H 2239/032; H05K 7/02
USPC ................................................ 174/250, 261
See application file for complete search history.

(56) References Cited

U.S. PATENT DOCUMENTS

| | | |
|---|---|---|
| 6,713,685 B1 | 3/2004 | Cotton |
| 7,156,233 B2 | 1/2007 | Clark et al. |
| 7,760,086 B2 | 7/2010 | Hunter et al. |
| 7,791,898 B2 | 9/2010 | Peytavy et al. |
| 8,624,130 B2 | 1/2014 | Bagung |
| 9,665,746 B2 | 5/2017 | Yanko et al. |
| 2003/0034855 A1* | 2/2003 | Wallace, Jr. ............. H04B 3/28 333/12 |

(Continued)

OTHER PUBLICATIONS

Shahparnia et al., *Electromagnetic Interference (EMI) Reduction From Printed Circuit Boards (PCB) Using Electromagnetic Bandgap Structures*, IEEE Transactions on Electromagnetic Compatibility, Nov. 2004, pp. 580-587, vol. 46, Issue 4, DOI: 10.1109/TEMC.2004.837671.

(Continued)

*Primary Examiner* — Sherman Ng
(74) *Attorney, Agent, or Firm* — Joseph D. Downing; Nathan M. Rau; Kennedy Lenart Spraggins LLP

(57) ABSTRACT

An embossed printed circuit board (PCB) for intrusion detection including a first security trace layer comprising a first serpentine trace monitored by a security sense circuit; a second security trace layer comprising a second serpentine trace monitored by the security sense circuit; a protected circuitry layer comprising circuitry protected from intrusion by the first security trace layer and the second security trace layer; and at least one embossed edge, wherein the at least one embossed edge comprises a fixed bend in at least one PCB layer, and wherein the fixed bend displaces at least one point of the at least one PCB layer a distance at least equivalent to a thickness of the at least one PCB layer.

18 Claims, 5 Drawing Sheets

(56) References Cited

U.S. PATENT DOCUMENTS

| | | | |
|---|---|---|---|
| 2005/0161253 A1* | 7/2005 | Heitmann | G06F 21/87 |
| | | | 174/261 |
| 2009/0213565 A1 | 8/2009 | Booth, Jr. et al. | |
| 2017/0222816 A1* | 8/2017 | Bartley | H04L 9/3263 |

OTHER PUBLICATIONS

Wikipedia, *FIPS*, wikipedia.org (online), accessed Aug. 4, 2017, 1 page, URL: https://en.wikipedia.org/wiki/FIPS.

\* cited by examiner

EMBOSSED PRINTED CIRCUIT BOARD FOR INTRUSION DETECTION

BACKGROUND

Field of the Invention

The field of the invention is data processing, or, more specifically, methods, apparatus, and products for an embossed printed circuit board for intrusion detection.

Description of Related Art

Sensitive circuits and data may be compromised by physical intrusions into the circuitry. Such intrusions may be used to probe the circuit to read a signal traveling from one component to another in order to, for example, obtain signals used to encrypt and decrypt data or to reverse engineer a component. Such sensitive circuits and data may require protection from these physical intrusions.

SUMMARY

An embossed printed circuit board (PCB) for intrusion detection includes a first security trace layer comprising a first serpentine trace monitored by a security sense circuit; a second security trace layer comprising a second serpentine trace monitored by the security sense circuit; a protected circuitry layer comprising circuitry protected from intrusion by the first security trace layer and the second security trace layer; and at least one embossed edge, wherein the at least one embossed edge comprises a fixed bend in at least one PCB layer, and wherein the fixed bend displaces at least one point of the at least one PCB layer a distance at least equivalent to a thickness of the at least one PCB layer.

Creating an embossed PCB for intrusion detection includes receiving a PCB comprising: a first security trace layer comprising a first serpentine trace monitored by a security sense circuit, a second security trace layer comprising a second serpentine trace monitored by the security sense circuit, and a protected circuitry layer comprising circuitry protected from intrusion by the first security trace layer and the second security trace layer; and embossing at least one edge of the PCB, including creating a fixed bend in at least one PCB layer, wherein the fixed bend displaces at least one point of the at least one PCB layer a distance at least equivalent to a thickness of the at least one PCB layer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
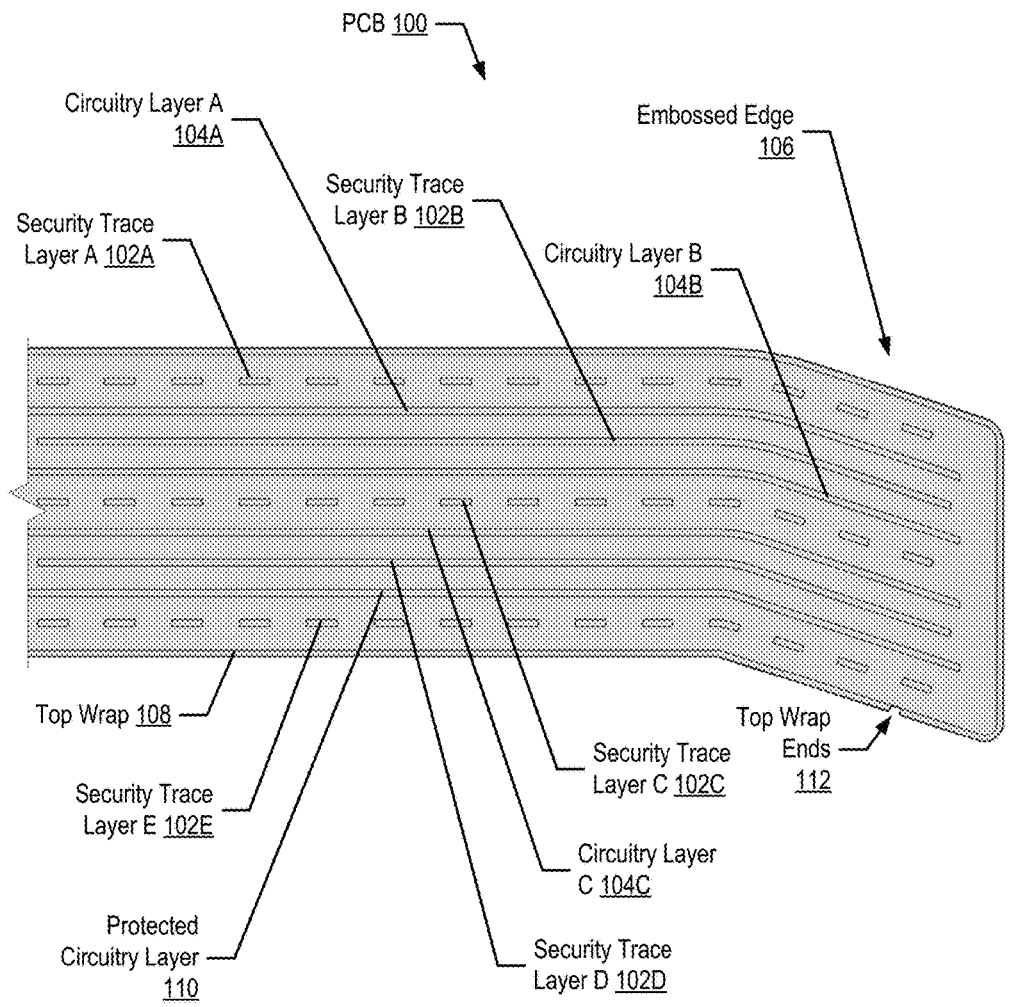
FIG. 1 depicts a side view of an example embossed printed circuit board (PCB) for intrusion detection in accordance with embodiments of the present invention.

An embossed printed circuit board (PCB) for intrusion detection and a method for creating an embossed PCB for intrusion detection in accordance with the present invention are described with reference to the accompanying drawings, beginning with FIG. 1. FIG. 1 shows a cross-section of an embossed PCB (100) for intrusion detection that includes multiple security trace layers (security trace layer A (102A), security trace layer B (102B), security trace layer C (102C), security trace layer D (102D), security trace layer E (102E)), multiple circuitry layers (circuitry layer A (104A), circuitry layer B (104B), circuitry layer C (104C)), a protected circuitry layer (110), a top wrap (108) that includes top wrap ends (112), and an embossed edge (106). FIG. 1 shows a cross section of one edge of the PCB (100). Each edge and each corner of the PCB (100) may also be embossed in the manner described herein.

The space between each labeled layer of the PCB (100) shown in FIG. 1 may include a non-conductive substrate. The PCB (100) may be a rigid PCB in which the non-conductive substrate includes rigid materials, such as fiberglass. The PCB (100) may be a flex PCB in which the non-conductive substrate includes flexible materials, such as polyimide.

Each security trace layer (security trace layer A (102A), security trace layer B (102B), security trace layer C (102C), security trace layer D (102D), security trace layer E (102E)) is a layer of the PCB (100) that provides intrusion detection for the non-embossed portion of the PCB (100). Specifically, the security trace layers include traces used to detect violations of the integrity of the PCB layer. A trace is an electric connection or wire between two components on a PCB (100). The traces on the security trace layers may be configured such that a full or partial severing of a trace triggers a security response.

The security trace layers (security trace layer A (102A), security trace layer B (102B), security trace layer C (102C), security trace layer D (102D), security trace layer E (102E)) may include serpentine traces. A serpentine trace is a trace made in a pattern that maximizes an area of the PCB layer covered by the trace. A serpentine trace may be a trace placed in a back-and-forth pattern reminiscent of the movement of a snake. A serpentine trace may be placed such that the space between traces or parts of a trace are smaller than the size of an expected intrusion tool.

The security trace layers may be set upon one another such that the pattern of the trace on one layer is perpendicular to the pattern of the trace on the adjacent layer or adjacent security layer. For two layers with serpentine traces, the pattern of the first serpentine trace on one security layer may be (primarily) perpendicular to the pattern of the second serpentine trace on another adjacent security layer. As shown in FIG. 1, security trace layer A (102A) has a serpentine trace that is oriented along a "z" axis relative to the viewer. Security trace layer B (102B) has a serpentine trace that is oriented along an "x" axis relative to the viewer. A perspective view of this configuration is presented in FIG. 2. Note that security trace layer A (102A) and security trace layer B (102B) are adjacent security trace layers in that no security trace layers exist between them (only circuitry layer A (104A) is between them).

The traces on the security trace layers may be communicatively coupled to a security sense circuit. A security sense circuit is a circuit configured to detect an intrusion and implement a security response. The security sense circuit may detect a full or partial severing of a trace on one or more of the security trace layers and generate a security response. The security sense circuit may reside on a security trace layer (security trace layer A (102A), security trace layer B (102B), security trace layer C (102C), security trace layer D (102D), security trace layer E (102E)), on a circuitry layer (circuitry layer A (104A), circuitry layer B (104B), circuitry layer C (104C)), or on the protected circuitry layer (100). The security response may be, for example, to destroy one or more elements of the protected circuitry layer (110), to invalidate a signal detectable by the intrusion tool, or to send an alert to an external entity that an intrusion has been detected.

The security trace layers (security trace layer A (102A), security trace layer B (102B), security trace layer C (102C), security trace layer D (102D), security trace layer E (102E)) and the security sense circuit may incorporate a Wheatstone bridge circuit. Specifically, the security trace layers and the security sense circuit may incorporate circuitry, such as a Wheatstone bridge circuit, that detects when one trace has been interrupted based on a comparison of a signal on the interrupted trace to another equivalent signal.

The PCB (100) also includes a protected circuitry layer (110). The protected circuitry layer (110) is a circuitry layer protected from intrusion by the security trace layers. The protected circuitry layer (110) may include circuitry that stores or generates sensitive data. For example, the protected circuitry layer (110) may include cryptographic key generators or storage for encryption keys. The circuitry layer may house items or devices of any size. For example, the circuitry layer may house a 1U sized server node.

The security trace layers (security trace layer A (102A), security trace layer B (102B), security trace layer C (102C), security trace layer D (102D), security trace layer E (102E)) may be positioned above the protected circuitry layer (110). Specifically, the protected circuitry layer (110) may exist on top of a non-conductive substrate and the security trace layers may be placed on the same side of the non-conductive substrate as the protected circuitry layer (110), and above the protected circuitry (100).

The PCB (100) also includes other circuitry layers (circuitry layer A (104A), circuitry layer B (104B), circuitry layer C (104C)). The circuitry layers may support the other elements of the PCB (100), such as the protected circuitry layer (110), security trace layers, or the security sense circuit. For example, the circuitry layers may include ground planes, power planes, or routing layers.

The PCB (100) also includes at least one embossed edge (106). The embossed edge (106) is a portion of the PCB (100) that has been embossed. As used herein, the term embossed refers to a permanent impression on the PCB (100). The embossed edge (106) may provide detection of lateral intrusions (i.e., intrusions from the side of the PCB (100)). Embossing the PCB (100) to create the embossed edge (106) includes creating a fixed bend in at least one PCB layer (100).

More than one PCB layer may be embossed with a fixed bend in order to protect against intrusions from the edge of the PCB (100). For example, two security trace layers (e.g., with serpentine traces that are primarily orthogonal to each other) may be embossed with a fixed bend to prevent intrusions through both PCB layers. As another example, two security trace layers and one circuitry layer may each be embossed with a fixed bend to provide intrusion detection to prevent intrusions to the non-embossed portion of the PCB. As a further example, each PCB layer of the PCB, including the exemplary layers shown in FIG. 1, may be embossed with a fixed bend to provide intrusion detection to prevent intrusions to the non-embossed portion of the PCB.

In order to protect against intrusions from the edge of the PCB (100) the fixed bend displaces at least one point of the at least one PCB layer a distance at least equivalent to a thickness of the at least one PCB layer. Specifically, the fixed bend creates a permanent impression that moves one or more layers of the PCB (100) such that at least part of a layer has been bent a distance (e.g., 0.5 mm) that is at least as long as the thickness of that layer (e.g., a layer that is 0.4 mm thick). The layer thickness may include the circuitry or a combination of the circuitry and the non-conductive substrate. The at least one point of the at least one layer may be the edge of the at least one layer. For example, assume that a PCB (100) includes three layers, and each layer is 0.3 mm thick. The PCB (100) may be embossed such that the fixed bend causes the edge of each layer to be 0.35 mm away (i.e., displaced) from the starting position (i.e., 0.35 mm down a vertical axis).

The embossed edge (106) may begin at a point outside a region of the PCB (100) that houses particular elements. For example, the protected circuitry on the protected circuitry layer (110). may not cover the entire protected circuitry layer (110) to each edge. Specifically, the protected circuitry layer (110) may not include protected circuitry at the edges of the PCB where the edge may be embossed.

The embossed edge (106) may include a fixed bend that is in a downward direction relative to the security trace layers (security trace layer A (102A), security trace layer B (102B), security trace layer C (102C), security trace layer D (102D), security trace layer E (102E)). Specifically, the security trace layers may be above the protected circuitry layer (110), and the fixed bend may be in the opposite direction (i.e., downward).

The PCB (100) also includes a top wrap (108) and top wrap ends (112). The top wrap (108), also called a pad cap, covers the other layers of the PCB (100), including the security trace layers (security trace layer A (102A), security trace layer B (102B), security trace layer C (102C), security trace layer D (102D), security trace layer E (102E)) and the protected circuitry layer (110). The top wrap ends (112) is the location where the ends of the top wrap (108) meet. Specifically, the top wrap ends (112) is the seam created by placing the top wrap (108) around other layers of the PCB (100). The top wrap ends (112) may meet with or without a gap between the top wrap ends (112). Further, the top wrap ends (112) may overlap with each other such that a portion of the top wrap (108) is multiple layers thick. The top wrap (108) may be applied before or after the edge of the PCB (100) is embossed.

The top wrap (108) may provide an electromagnetic shield over the security trace layers (security trace layer A (102A), security trace layer B (102B), security trace layer C (102C), security trace layer D (102D), security trace layer E (102E)) and protected circuitry layer (110). The top wrap (108) may be made of a material and placed in such a way over the PCB (100) and embossed edge (106) as to mitigate the effect of electromagnetic radiation on the circuitry within the PCB (100). The top wrap (108) may include materials such as copper or nickel to aid in providing the electromagnetic shield.

Although FIG. 1 depicts the layers of the PCB (100) in a specific order, the layers may be placed in different arrangements according to the description above. For example, the protected circuitry layer (110) may reside between security trace layer E (102E) and the portion of the top wrap (108) at the bottom of the PCB (110).

Figure 2:
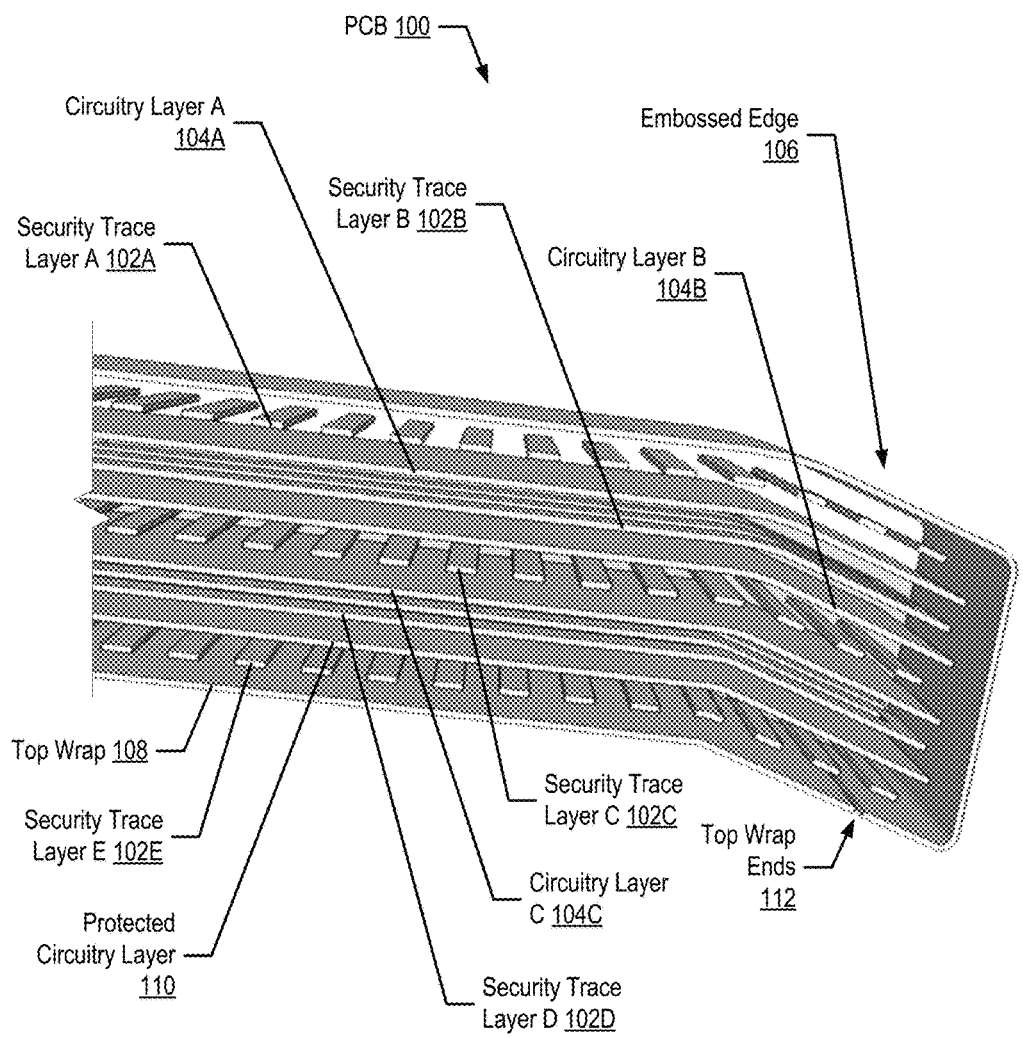
FIG. 2 depicts a perspective view of an example embossed PCB for intrusion detection in accordance with embodiments of the present invention.

FIG. 2 shows a perspective view of a cross-section of an embossed PCB (100) for intrusion detection that includes multiple security trace layers (security trace layer A (102A), security trace layer B (102B), security trace layer C (102C), security trace layer D (102D), security trace layer E (102E)), multiple circuitry layers (circuitry layer A (104A), circuitry layer B (104B), circuitry layer C (104C)), a protected circuitry layer (110), a top wrap (108) that includes top wrap ends (112), and an embossed edge (106).

Figure 3:
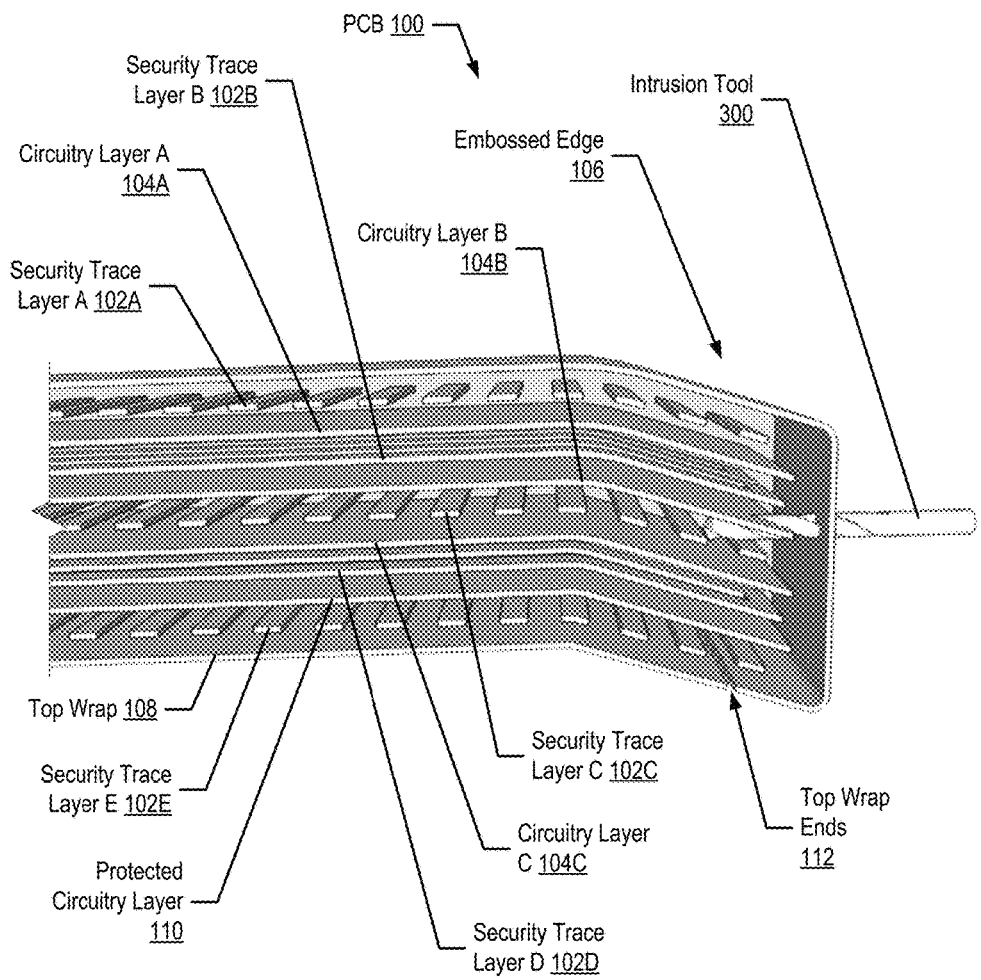
FIG. 3 depicts a perspective view of an example embossed PCB for intrusion detection in accordance with embodiments of the present invention.

FIG. 3 shows a perspective view of a cross-section of an embossed PCB (100) for intrusion detection that includes multiple security trace layers (security trace layer A (102A), security trace layer B (102B), security trace layer C (102C), security trace layer D (102D), security trace layer E (102E)), multiple circuitry layers (circuitry layer A (104A), circuitry layer B (104B), circuitry layer C (104C)), a protected circuitry layer (110), a top wrap (108) that includes top wrap ends (112), and an embossed edge (106).

FIG. 3 shows an attempted intrusion by an intrusion tool (300). The intrusion tool (300) is depicted as a drill bit entering from the side of the PCB (100). The intrusion tool (300) may be attempting to probe elements on the protected circuitry layer (110). However, in order to reach the protected circuitry on the protected circuitry layer (110), the drill bit must sever at least part of one trace within security trace layer C (102C). The security sense circuit would detect that the trace has been severed and take action in response, such as invalidating any generated cryptographic codes.

Figure 4:
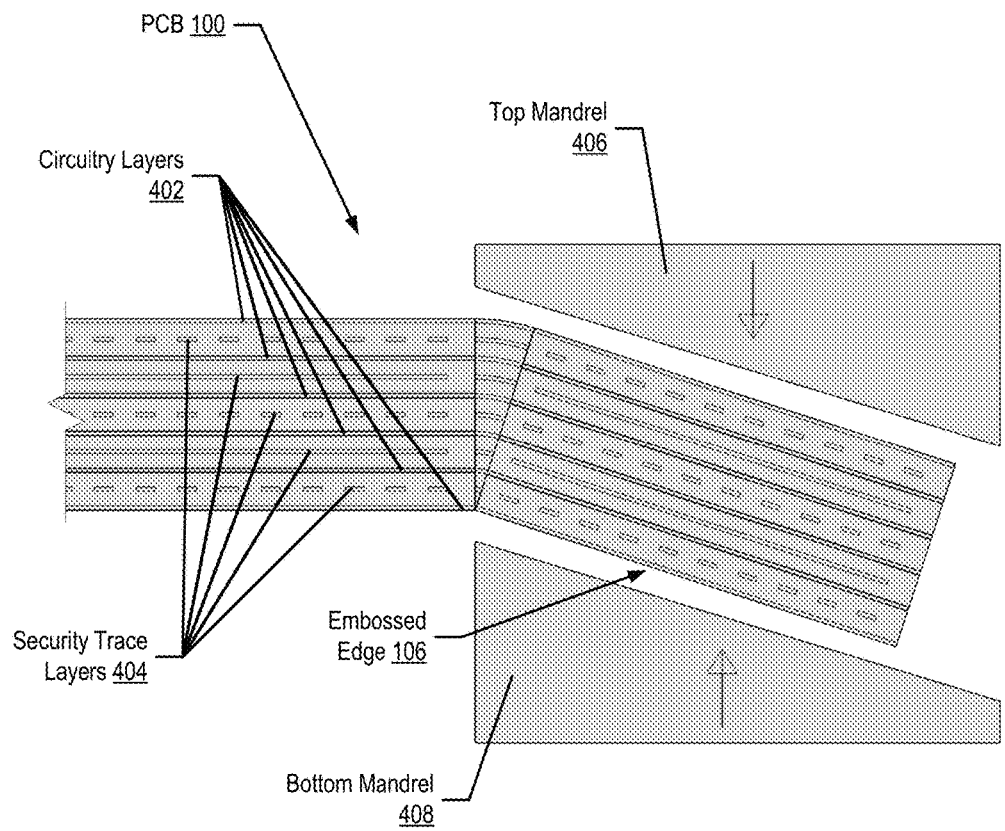
FIG. 4 depicts a side view of an example embossed PCB for intrusion detection in accordance with embodiments of the present invention.

FIG. 4 shows a cross-section of an embossed PCB (100) for intrusion detection. The PCB (100) includes circuitry layers (402) similar to the circuitry layers described in FIG. 1, and security trace layers (404) similar to the security trace layers described in FIG. 1. FIG. 4 depicts part of an example process for creating an embossed edge (106) of the PCB (100).

As shown in FIG. 4, the PCB (100) is inserted between two mandrels (top mandrel (406), bottom mandrel (408)). The mandrels emboss the PCB with a fixed bend to create the embossed edge (106). Specifically, the mandrels (top mandrel (406), bottom mandrel (408)) use force to bend the PCB (100) a controlled distance. The PCB (100) may be heated as part of the embossing process in order to facilitate bending the edge of the PCB (100) without otherwise damaging the layers of the PCB (100).

The embossed edge (106) may be created using methods not described above. Further, the embossing process employed may be dependent upon the type of PCB (100) (e.g., a rigid PCB or a flex PCB).

Figure 5:
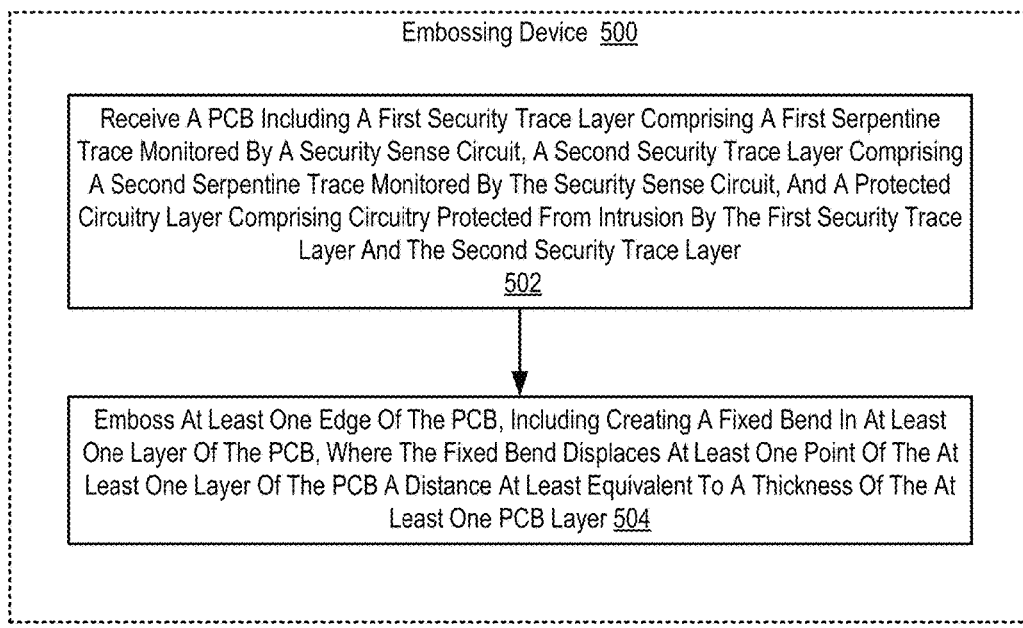
FIG. 5 sets forth a flow chart illustrating an exemplary method for an embossed PCB for intrusion detection according to embodiments of the present invention.

For further explanation, FIG. 5 sets forth a flow chart illustrating an exemplary method for creating an embossed PCB for intrusion detection according to embodiments of the present invention that includes receiving (502) a PCB including a first security trace layer comprising a first security trace monitored by a security sense circuit, a second security trace layer comprising a second Security trace monitored by the security sense circuit, and a circuitry layer comprising circuitry protected from intrusion by the first security trace layer and the second security trace layer; and embossing (504) at least one edge of the PCB, including creating a fixed bend in at least one PCB layer, wherein the fixed bend displaces at least one point of the at least one PCB layer a distance at least equivalent to a thickness of the at least one PCB layer.

Receiving (502) a PCB including a first security trace layer comprising a first security trace monitored by a security sense circuit, a second security trace layer comprising a second security trace monitored by the security sense circuit, and a circuitry layer comprising circuitry protected from intrusion by the first security trace layer and the second security trace layer may be carried out by positioning a PCB in an embossing device (500), such as a mandrel. An embossing device (500) is a device capable of embossing the edge of a PCB.

Embossing (504) at least one edge of the PCB, including creating a fixed bend in at least one PCB layer, wherein the fixed bend displaces at least one point of the at least one PCB layer a distance at least equivalent to a thickness of the at least one PCB layer may be carried out by activating the embossing device (500) to create the fixed bend in the PCB. The embossing device (500) may use mandrels, heat, force, or other devices and methods to create a fixed bend in the PCB.

In view of the explanations set forth above, readers will recognize that the benefits of an embossed PCB for intrusion detection according to embodiments of the present invention include:

Improving the operation of a PCB by detecting lateral intrusions by embossing the edges of the PCB, increasing PCB security.

Improving the operation of a PCB by detecting lateral intrusions using an embossed edge with a smaller footprint than traditional intrusion protection methods, increasing PCB efficiency.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A printed circuit board (PCB) comprising:
   a first security trace layer comprising a first serpentine trace monitored by a security sense circuit;
   a second security trace layer comprising a second serpentine trace monitored by the security sense circuit;
   a protected circuitry layer comprising circuitry protected from intrusion by the first security trace layer and the second security trace layer; and
   at least one embossed edge, wherein the at least one embossed edge comprises a fixed bend in at least one PCB layer, and wherein the fixed bend displaces at least one point of the at least one PCB layer a distance at least equivalent to a thickness of the at least one PCB layer.

2. The PCB of claim 1, further comprising a top wrap covering the first security trace layer, the second security trace layer, and the protected circuitry layer.

3. The PCB of claim 2, wherein the top wrap provides an electromagnetic shield over the first security trace layer, the second security trace layer, and the protected circuitry layer.

4. The PCB of claim 1, wherein the first security trace layer and the second security trace layer are above the protected circuitry layer.

5. The PCB of claim 4, wherein the fixed bend is in a downward direction relative to the first security trace layer and the second security trace layer.

6. The PCB of claim 1, wherein the PCB is a flex PCB.

7. The PCB of claim 1, wherein the PCB is embossed using a mandrel.

8. The PCB of claim 1, wherein a pattern of the first serpentine trace is perpendicular to a pattern of the second serpentine trace.

9. The PCB of claim 1, wherein the security sense circuit is a Wheatstone bridge circuit.

10. A method for creating an embossed printed circuit board (PCB) for intrusion detection, the method comprising:
  receiving a PCB comprising:
    a first security trace layer comprising a first serpentine trace monitored by a security sense circuit,
    a second security trace layer comprising a second serpentine trace monitored by the security sense circuit, and
    a protected circuitry layer comprising circuitry protected from intrusion by the first security trace layer and the second security trace layer; and
  embossing at least one edge of the PCB, including creating a fixed bend in at least one PCB layer, wherein the fixed bend displaces at least one point of the at least one PCB layer a distance at least equivalent to a thickness of the at least one PCB layer.

11. The method of claim 10, further comprising wrapping the embossed PCB in a top wrap covering the first security trace layer, the second security trace layer, and the protected circuitry layer.

12. The method of claim 11, wherein the top wrap provides an electromagnetic shield over the first security trace layer, the second security trace layer, and the protected circuitry layer.

13. The method of claim 10, wherein the first security trace layer and the second security trace layer are above the protected circuitry layer.

14. The method of claim 13, wherein the fixed bend is in a downward direction relative to the first security trace layer and the second security trace layer.

15. The method of claim 10, wherein the PCB is a flex PCB.

16. The method of claim 10, wherein the PCB is embossed using a mandrel.

17. The method of claim 10, wherein a pattern of the first serpentine trace is perpendicular to a pattern of the second serpentine trace.

18. The method of claim 10, wherein the security sense circuit is a Wheatstone bridge circuit.

* * * * *